United States Patent [19]

Kato et al.

[11] Patent Number: 4,787,716
[45] Date of Patent: Nov. 29, 1988

[54] COLOR MEMBER AND METHOD FOR MANUFACTURING SAME

[75] Inventors: Naoki Kato; Koji Iwasa; Hitoshi Kamamori; Mitsuru Suginoya; Yutaka Sano; Yumiko Terada, all of Tokyo, Japan

[73] Assignee: Seiko Instruments & Electronics Ltd., Tokyo, Japan

[21] Appl. No.: 706,479

[22] Filed: Feb. 28, 1985

[30] Foreign Application Priority Data

Feb. 28, 1984 [JP] Japan .................. 59-36786

[51] Int. Cl.$^4$ .............................................. G02F 1/01
[52] U.S. Cl. ..................................... 350/357; 350/353
[58] Field of Search ............ 350/357, 363, 357, 353, 350/320, 317; 340/785; 204/40

[56] References Cited

U.S. PATENT DOCUMENTS

| | | | |
|---|---|---|---|
| 3,681,223 | 8/1972 | Gupton, Jr. ................. | 204/181 |
| 4,115,227 | 9/1978 | Hazan ......................... | 204/181 |
| 4,130,472 | 12/1978 | Kaplan et al. ............... | 204/181 |
| 4,174,152 | 11/1979 | Giglia et al. ................ | 350/357 |
| 4,182,551 | 1/1980 | Washida et al. ............. | 350/357 |
| 4,222,828 | 9/1980 | Zuurdeeg .................... | 204/16 |
| 4,278,579 | 7/1981 | Murphy ....................... | 260/29.3 |
| 4,304,465 | 12/1981 | Diaz ............................ | 350/357 |
| 4,431,989 | 2/1984 | Grange et al. .............. | 350/363 |
| 4,522,691 | 6/1985 | Suginoya et al. ........... | 204/18.1 |

FOREIGN PATENT DOCUMENTS

| | | | |
|---|---|---|---|
| 53-118363 | 10/1978 | Japan ...... | 204/18.5 |
| 54-16972 | 2/1979 | Japan ...... | 204/181.1 |

*Primary Examiner*—Bruce Y. Arnold
*Attorney, Agent, or Firm*—Bruce L. Adams; Van C. Wilks

[57] ABSTRACT

A colored article, e.g., a multicolored filter for a display device, comprises a first electroconductive layer with a low resistance formed on a substrate. A second electroconductive layer resistant to electrolytic corrosion and comprised, e.g., of $SnO_2$, $Sb_2O_3$, ZnO, CdO, $Ga_2O_3$, Au, Ag, Ni, Al and Si, is formed directly on the first layer. A color layer is formed on the second layer by electrodeposition to impart a desired color tone to the article.

39 Claims, 1 Drawing Sheet

COLOR MEMBER AND METHOD FOR MANUFACTURING SAME

BACKGROUND OF THE INVENTION

This invention relates to a color member or colored article, e.g., a color filter for a multicolor display device, and to a method for manufacturing the color member.

FIG. 1 illustrates an example in which color members are applied as a multicolor filter to a display device. In the drawing, reference numeral 1 denotes a transparent substrate, 2a, 2b and 2c denote display electrodes comprised of a transparent electroconductive film patterned in a desired figure or character, and 3a, 3b and 3c denote colored layers formed on the surface of the display electrode in close contact therewith. The colored layers 3 serve as color filters. Reference numeral 4 denotes a transparent counter electrode, and 5 denotes a transparent opposite substrate. A material which passes or blocks an incident light in response to a voltage applied thereto to function as an optical shutter, such as a liquid crystal or an electrochromic material, is filled in the space defined between the two substrates 1 and 5. If the color filters 3a, 3b and 3c are of mutually different colors, a multicolor display can be provided by selectively applying voltages between the display electrodes 2a, 2b, 2c and the counter electrode 4.

A multicolor display using color filters is very effective in practice, because the method is simple, any color can be obtained easily, and a variety of display materials can be employed in combination with a variety of display systems.

When manufacturing a multicolor display device using color filters, however, care must be taken to prevent any displacement between the pattern of the color filter formed on the surface of the display electrode and the pattern of the display electrode. Particularly, when manufacturing a color graphic display using a fine pattern of three primary colors, a crucial problem from the point of view of the manufacturing process is how to align the pattern of the display electrode with that of the color filters. Color separation among the three primary colors in manufacturing the multicolor display also requires a complicated manufacturing process, and, particularly when the coloring of the display electrodes is achieved by dyeing, a dye resist coating process must be added to prevent portions which have already been dyed from being dyed again by a different dye, so that the dyeing process is even more complicated. In addition, the resist-dyeing technique itself has various problems that must be individually examined according to the kind of dye used.

Screen printing and photolithography are methods generally used for forming the colored layers. Screen printing eliminates the necessity of resist-coating, but there is a limit in making the line pattern. Therefore, the greater the number of colors, the lower the accuracy of the printing position, and the greater the displacement of the resultant colored layer from the display electrode. It is also difficult to produce shading of colors, particularly continuous color shading.

Photolithography can provide a fine pattern, but the photolithography process must be repeated for each color with the necessity of additional resist-coating to prevent re-dyeing during dyeing of the different color. This makes the process so complicated that the merit of this simple coloring method is lost.

As a method of forming a colored layer which can eliminate all the problems described above, the inventors of the present invention previously proposed an electrodeposition method in which a display electrode on a substrate is used as an electrodeposition electrode, and the colored layer is formed from a solution in which an electrodepositable polymer and a dye or pigment are dispersed by using electrodeposition (Japanese Patent Application No. 233,933/1982). In spite of its relative simplicity, this method does not have the problem of pattern displacement even when the patterns are highly miniaturized, and can be used to economically produce a multicolored member with a high colorfastness without the necessity of any specific dyeing process when the colors are changed. If a material which is electrochemically unstable, such as $In_2O_3$, is used as an electrode when forming the colored layers in accordance with this method, an oxidation-reduction reaction takes place on the surface of the electrode so that a uniformly colored layer can not be obtained. As a result of studies, the inventors of the present invention have discovered that an electrode made of $SnO_2$ can provide a uniformly colored layer, but a voltage drop occurs along the electrode. A display electrode of a display device is provided with a display electrode of a fine pattern when $SnO_2$ alone is used as the transparent conductive display electrode, the voltage drop occurs along the display electrode, because its volumetric resistance is high. Particularly, in a time sharing mode of display drive which requires a high driving frequency, the magnitude of this voltage drop varies according to distance from a lead terminal, and this has an adverse effect on the display quality. The thickness of the $SnO_2$ film can be increased to reduce its resistance, but the increased thickness greatly reduces the optical transparency of the transparent conductive film.

SUMMARY OF THE INVENTION

An object of the invention is to provide an improved color member.

Another object of the invention is to provide a color member having a uniform color layer.

A further object of the invention is to provide a color member produced by using electrodeposition which has a uniform color layer and a conductive layer with a low resistance.

Still a further object of the invention is to provide a color member produced by using electrodeposition which may be used as a color filter for a time-sharingly driven color display device.

DETAILED DESCRIPTION OF THE INVENTION

In order to reduce the electrical resistance of an electrically conductive layer and obtain a colored layer with a uniform surface by electrodeposition, the conductive layer of the present invention has a multilayered structure, the uppermost layer being made of an electroconductive material resistant or immune to the a reactive corrosion according to the electrolysis of water, e.g., tin oxide ($SnO_2$), antimony oxide ($Sb_2O_3$), zinc oxide (ZnO), cadmium oxide (CdO), gallium oxide ($Ga_2O_3$), germanium oxide ($GeO_2$), gold (Au), silver (Ag), nickel (Ni), aluminum (Al) or silicon (Si), and the lower layer having a low electrical resistance or large electroconductivity.

Hereinafter the present invention will be described more specifically with reference to some preferred embodiments thereof.

(Embodiment 1)

Figure 1:
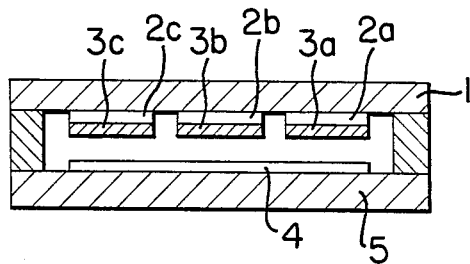
FIG. 1 is a schematic sectional view of a conventional color display device with a color member.
Figure 2:
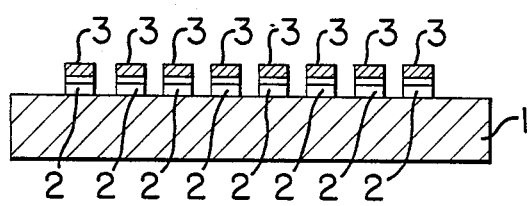
FIG. 2 is a schematic sectional view of a color member according to the present invention.
Figure 3A:
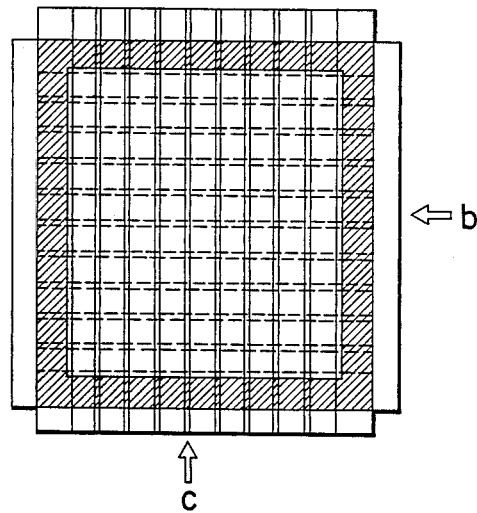
FIG. 3(a) is a plan view of a color display device with a color member according to the present invention.
Figure 3B:
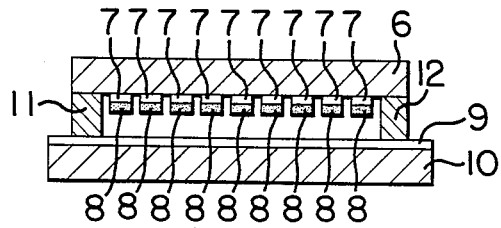
FIGS. 3(b) and 3(c) are schematic sectional views of the display device of FIG. 3(a), viewed from the direction "b" and "c" respectively.
Figure 3C:
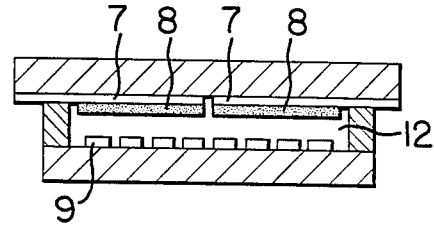

FIG. 2 is a section of a multicolor filter to which the present invention is applied. In this embodiment, an electrically conductive layer 2 consists of a lower layer of indium oxide ($In_2O_3$) and an upper layer of tin oxide ($SnO_2$). FIG. 3(a) shows an example of the multicolor display device to which the present invention is applied.

First of all, an $In_2O_3$ film was formed on a substrate b in a given stripe pattern by sputtering, at the thickness of about 800 Å. An $SnO_2$ film was then formed or directly superposed over the $In_2O_3$ film by CVD at the thickness of about 500 Å. The drop in optical transparency resulting from this two-layered structure was much smaller than that of a $SnO_2$ film which has an equivalent sheet resistance.

The two-layered transparent conductive film was patterned so that it was able to be used as an electrode in an electrodeposition bath of the composition below, prepared by using a paint "S-Via ED-3000", a product of Jinto Paint K.K.

| Electrodeposition bath Material | Weight ratio |
| --- | --- |
| "S-Via ED-3000" | 5 |
| Water | 120 |
| Methyl Cellosolve | 15 |
| Oil-soluble dye "S-Via ED-3000" | x |
| Water-soluble polyester resin | 70% by weight |
| Water-soluble melamine resin | |
| Butyl Cellosolve | 30% by weight |
| Ethyl Cellosolve | |
| n-Butanol | |

The organic coloring material or oil-soluble dyes that can be used are limited to those which are soluble in hydrophilic solvents. They preferably have a metal complex salt structure with an extremely high degree of light-fastness. An example of such an oil-soluble dye has the following molecular structure (trade names: "Aizen Spilon", "Oleosol Fast", etc.,):

Cr complex salt of

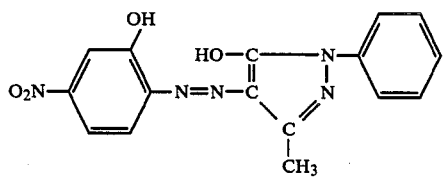

(color index number: Solvent Red 8)

The bath was prepared in the following manner. First "S-Via ED-3000" was dissolved in water, and then the dye was dissolved in the methyl Cellosolve. Various dye weight ratios x, in this instance, were selected arbitrarily within a range which did not exceed the solubility of the dye in methyl cellosolve. The methyl cellosolve in which the dye was dissolved was then added to the aqueous solution, and the dye was uniformly dispersed. In this case, the methyl cellosolve acted as a dispersion medium, if the quantity added is too great, or if the number of carbon atoms in the alkyl groups of the cellosolve is increased, the film thickness would increase or the film would become non-uniform.

A display substrate 6, on which display electrodes 7 were formed, was immersed in the electrodeposition bath prepared in the manner described above. The display electrodes 7 were patterned in a stripe form, some electrodes that were to be colored the same color were selected, and a 10 V voltage was applied with the selected electrodes acting as anodes for three minutes. A large current flowed immediately after the application of the voltage, but the current decreased gradually and approached zero. After the application of the voltage, the display substrate 6 was removed from the bath and was well washed in water to wash off the solution deposited onto non-selected display electrodes 7 to which no voltage was applied. After being washed in water, the electrodes were dried, and a transparent color layer was formed over the electrodes to which the voltage had been applied. Curing step The polyester resin and the melamine resin within the colored layer formed by the electrodeposition were next subjected to a polycondensation reaction and were cured by baking. The colored layer was completely cured by baking effected at 175° C. for 30 minutes in air. In this case, the colored layer was 1.5 μm thick.

The cured colored layer was a perfect insulating layer so that re-electrodeposition or re-dyeing did not occur even when the substrate was again immersed in another electrodeposition bath containing a different color dye and the voltage was again applied to the electrodes. Accordingly, when second and subsequent color layers were formed, other display electrodes which were to be colored another color were selected, and were then subjected to electrodeposition in the electrodeposition bath in which a dye of a different color was dispersed. Thereafter, the curing process was carried out. This process was repeated to form a third colored layer of a different color tone.

In the embodiment described above, a color filter 8 with 200 μm wide stripes of red, blue and green was obtained extremely simply by the steps of patterning, electrodeposition of red layers, curing, electrodeposition of blue layers, curing, electrodeposition of green layers, and curing. The color filter thus obtained was completely free from pattern displacement, was uniform and was resistant to acids, alkalines, various organic solvents, and hot water. The metal complex salt dyes used in the colored layers were extremely stable and unchanging and had as extremely high degree of light-fastness, and exhibited a light absorption of at least 95% of the initial value even 360 hours after a carbon arc test.

The color filter 8 was formed over the display electrodes 7 by the method described above, and the display substrate 6 was coupled to a transparent opposite substrate 10 on which transparent counter electrodes 9 were formed in a stripe pattern, with a spacer 11 between the two opposed substrates band 10, in such a manner that the display electrodes 7 crossed the stripes of the counter electrodes 9 at right angles, to form a cell. A TN-FEM liquid crystal acting as a display material 12 was charged into the cell to provide a multicolor display device. After a voltage was applied between the display electrodes 7 and the counter electrodes 9, and the cell was sandwiched between a polarizer and an analyzer with aligning axes of transmission of the polarizer and analyzer in parallel, the colors of the transparent color filter 8 were displayed when viewed either from the direction of the display substrate 6 or that of the opposite substrate 10, and the color thereof become black when the application of the voltage was stopped. When an incident light was introduced from the opposite substrate 10, the colors of the color filter 8 were displayed more effectively when viewed from the display substrate 6, because the transparency of the cell was higher.

Since the transparent conductive film display electrodes were formed of two layers of $In_2O_3$ and $SnO_2$ formed thereon, the color layers had a uniform surface without any drops in transmissivity, and a cell with a low-resistance conductive film display electrode was obtained.

It became apparent that in spite of the simplicity in construction, the cell of this embodiment of the color member was driven at a low voltage, exhibited only a limited power consumption, and had a high display quality as well as a high reliability.

(Embodiment 2)

Pigments was used in place of the oil-soluble dyes of Embodiment 1 to prepare electrodeposition baths, and electrodeposition was carried out by using these baths. Uniform color layers were obtained in the same way as in Embodiment 1. Using the colored layers, a multicolor display device was produced in the same way as in Embodiment 1 except that the display material 12 of Embodiment 1 was replaced by a negative type of guest-host liquid crystal using a black dichromic pigment, and the display substrate 6 was replaced by a white material (white ceramic). When a voltage was applied between the display electrodes 7 and the counter electrode 9 and the device was viewed from the direction of the transparent opposite substrate 10 through a deflector, the colors of the color filter 8 were displayed brightly. When the application of the voltage was stopped, the device turned black which was the color of the dichromic pigment. Effects substantially the same as those of Embodiment 1 was obtained by this embodiment.

(Embodiment 3)

In place of the upper layer of tin oxide ($SnO_2$), each of the layers composed of antimony oxide ($Sb_2O_3$), zinc oxide (ZnO), cadmium oxide (CdO), gallium oxide ($Ga_2O_3$) and germanium oxide ($GeO_2$), gold (Au) thin layer, silver (Ag) thin layer, nickel (Ni) thin layer, aluminum (Al) thin layer, and silicon (Si) thin layer were used respectively, and electrodeposition was carried out by using these layers in a similar way as in Embodiment 1. Consequently, uniform color layers were obtained in case of using any of the above material. Using the color layers, a multicolor display device was produced in the same way as in Embodiment 1 so that effects substantially the same as those of Embodiment 1 were obtained.

As described above, when a multi-layered conductive film in accordance with the present invention is employed, it is possible to obtain an improved color member having a uniform color layer on a conductive film which has a low resistance. The display device using the color member of the invention is suitable for a time-sharingly driven color display.

What is claimed is:

1. A colored article comprising: a substrate; a first electroconductive layer disposed on said substrate; a second electroconductive layer directly superposed on said first electroconductive layer, the second electroconductive layer being comprised of a material selected from the group consisting of tin oxide, antimony oxide, zinc oxide, cadmium oxide, gallium oxide, germanium oxide, gold, silver, nickel, aluminum and silicon; and a colored layer superposed on the second electroconductive layer.

2. A colored article as claimed in claim 1; wherein said colored layer comprises an organic coloring material electrodeposited on the second electroconductive layer.

3. A colored article as claimed in claim 1; wherein said colored layer comprises an organic coloring material and a polymer co-electrodeposited together on the second electroconductive layer.

4. A colored article as claimed in claim 1; wherein said first and second electroconductive layers comprise light transmissive layers.

5. A colored article as claimed in claim 1; wherein said first electroconductive layer has an electric resistance lower than that of the second electroconductive layer.

6. A colored article as claimed in claim 1; wherein said first electroconductive layer is comprised of indium oxide.

7. A colored article as claimed in claim 1; including a plurality of colored layers comprised of red, blue and green layers.

8. A color filter comprising: a substrate; a first electroconductive layer disposed on said substrate; a second electroconductive layer directly superposed on said first electroconductive layer; the second electroconductive layer being comprised of a material selected from the group consisting of tin oxide, antimony oxide, zinc oxide, cadmium oxide, gallium oxide, germanium oxide, gold, silver, nickel, aluminum and silicon; and a colored layer superposed on the second electroconductive layer.

9. A display device including a color filter as claimed in claim 8.

10. A method for manufacturing a colored article comprising the steps of: forming a first electroconductive layer on a substrate; forming a second electroconductive layer on said first electroconductive layer, the second electroconductive layer being made of a material selected from the group consisting of tin oxide, antimony oxide, zinc oxide, cadmium oxide, gallium oxide, germanium oxide, gold, silver, nickel, aluminum and silicon; and forming a colored layer on said second electroconductive layer by co-electrodepositing an organic coloring material and a polymer on said second electroconductive layer.

11. A colored article manufactured according to the method of claim 10.

12. A method for manufacturing a multicolored article comprising the steps of: forming a plurality of first electroconductive layers on a substrate; forming a plurality of second electroconductive layers superposed of said first electroconductive layers, the second electroconductive layers being made of a material selected from the group consisting of tin oxide, antimony, oxide, zinc oxide, cadmium oxide, gallium oxide, germanium oxide, gold, silver, nickel, aluminum and silicon; and forming a plurality of colored layers of different colors on respective ones of said second electroconductive layers by co-electrodepositing a coloring material of a different color and a polymer on said second electroconductive layers.

13. A method for manufacturing a multicolored article as claimed in claim 12; wherein each of the colored layers is composed of a mixture of an electrodeposition polymer and a coloring material of a different color which are electrolytically co-deposited from a solution containing the electrodeposition polymer and the coloring material.

14. A method for manufacturing a multicolored article as claimed in claim 13; wherein said coloring material comprises a water-insoluble coloring material.

15. A method for manufacturing a multicolored article as claimed in claim 13; wherein said coloring material is selected from the group consisting of pigments, dispersed dyes and solvent dyes.

16. A method for manufacturing a multicolored article as claimed in claim 13; wherein the electrodeposition polymer comprises a negatively charged polymer.

17. A method as claimed in claim 10 or 12; wherein said first and second electroconductive layers are comprised of light transmissive layers.

18. A method as claimed in claim 10 or 12; wherein said first electroconductive layer has an electric resistance lower than that of the second electroconductive layer.

19. A method for manufacturing a multicolored article as claimed in claim 12; wherein said first electroconductive layer is comprised of indium oxide.

20. A method for manufacturing a multicolored article as claimed in claim 12; wherein the colored layers comprise red, blue and green layers.

21. A method for manufacturing a multicolored filter comprising the steps of: forming a plurality of electroconductive layers on a substrate; forming a plurality of second electroconductive layers superposed on said first electroconductive layers, the second electroconductive layers being made of a material selected from the group consisting of tin oxide, antimony oxide, zinc oxide, cadmium oxide, gallium oxide, germanium oxide, gold, silver, nickel, aluminum and silicon; and forming a plurality of colored layers of different colors on respective ones of the second electroconductive layers by co-electrodepositing a coloring material of a different color and a polymer of said second electroconductive layers.

22. A display device including a multicolored filter manufactured by the method claimed in claim 21.

23. A colored article comprising: a substrate; a first electroconductive layer formed on the substrate; a second electroconductive layer formed directly on the first electroconductive layer and having a resistance to electrolytic corrosion superior to that of the first electroconductive layer to thereby protect the first electroconductive layer from electrolytic corrosion; and a third layer containing coloring material uniformly electrolytically deposited and permanently fixed on the second electroconductive layer to thereby impart a desired non-changeable color tone to the article.

24. A colored article as claimed in claim 23; wherein the first layer has an electroconductivity greater than that of the second layer.

25. A colored article as claimed in claim 23; wherein the first layer comprises indium oxide.

26. A colored article as claimed in claim 23; wherein the second layer comprises a material selected from the group consisting of tin oxide, antimony oxide, zinc oxide, cadmium oxide, gallium oxide, germanium oxide, gold, silver, nickel, aluminum and silicon.

27. A colored article as claimed in claim 23; wherein the third layer comprises a coloring material and a polymer co-deposited together on the electrode.

28. A colored article as claimed in claim 23; wherein the coloring material comprises an organic coloring material.

29. A colored article as claimed in claim 23; wherein the substrate and the first, second and third layers are comprised of optically transparent material to thereby define a color filter.

30. A display device including the color filter as claimed in claim 31; wherein the first layer defines a display electrode.

31. A colored article as claimed in claim 23; including a plurality of first layers, and a plurality of second layers superposed on respective ones of the first layers.

32. A colored article as claimed in claim 31; including a plurality of third layers of different color tones deposited on respective ones of the second layers.

33. A colored article as claimed in claim 32; wherein the plurality of third layers have red, blue and green color tones.

34. A colored article as claimed in claim 23; wherein the first electroconductive layer has a given pattern.

35. A colored article as claimed in claim 34; wherein the first electroconductive layer has sufficient electroconductivity throughout the pattern to distribute a voltage without a substantial voltage drop throughout the pattern when connected to an external voltage supply line.

36. A colored article as claimed in claim 35, wherein the second layer has sufficient electroconductivity along the thickness direction thereof to work as an electrodeposition electrode when the voltage distributed throughout the pattern is transmitted to the second layer.

37. A method of manufacturing a colored article comprising the steps of: forming a first electroconductive layer on a substrate in a given pattern; forming a second electroconductive layer, which is more immune to electrolytic corrosion than the first electroconductive layer, directly on the first electroconductive layer to thereby chemically protect the first electroconductive layer; immersing the substrate in an electrodeposition bath containing a coloring material; and applying a voltage to the first electroconductive layer to electrodeposit the coloring material on the second electroconductive layer to form a colored layer having an unchanging color tone.

38. A method as claimed in claim 37; wherein the first electroconductive layer has sufficient electroconductivity throughout the pattern to distribute a voltage without a substantial voltage drop throughout the pattern when connected to an external voltage supply line.

39. A method as claimed in claim 38; wherein the second electroconductive layer has sufficient electroconductivity along the thickness direction thereof to work as an electrodeposition electrode when the voltage distributed through the pattern is transmitted to the second layer.

* * * * *